United States Patent
Addepalli et al.

(10) Patent No.: US 9,313,275 B2
(45) Date of Patent: Apr. 12, 2016

(54) COMMUNICATION PROTOCOL FOR ENERGY-HARVESTING DEVICES

(75) Inventors: Sateesh K. Addepalli, San Jose, CA (US); Raghuram S. Sudhaakar, Mountain View, CA (US); Jean-Philippe Vasseur, Saint Martin d'Uriage (FR)

(73) Assignee: Cisco Technology, Inc., San Jose, CA (US)

(*) Notice: Subject to any disclaimer, the term of this patent is extended or adjusted under 35 U.S.C. 154(b) by 647 days.

(21) Appl. No.: 13/297,997

(22) Filed: Nov. 16, 2011

(65) Prior Publication Data

US 2013/0121176 A1    May 16, 2013

(51) Int. Cl.
*H04L 29/08* (2006.01)
*H05B 37/02* (2006.01)

(52) U.S. Cl.
CPC ............ *H04L 67/12* (2013.01); *H05B 37/0272* (2013.01)

(58) Field of Classification Search
CPC ...................................................... H04L 67/12
See application file for complete search history.

(56) References Cited

U.S. PATENT DOCUMENTS

| | | | | |
|---|---|---|---|---|
| 7,986,217 | B2* | 7/2011 | Barnes et al. ................ | 340/10.1 |
| 8,552,597 | B2* | 10/2013 | Song et al. ................... | 307/149 |
| 8,588,830 | B2* | 11/2013 | Myer et al. ................... | 455/507 |
| 2007/0099677 | A1* | 5/2007 | Hsu et al. ..................... | 455/574 |
| 2007/7280275 | | 12/2007 | Castagnoli et al. | |
| 2009/0157141 | A1* | 6/2009 | Chiao et al. .................... | 607/46 |
| 2011/0066297 | A1* | 3/2011 | Saberi et al. .................. | 700/287 |
| 2012/0177095 | A1* | 7/2012 | Haran et al. ................... | 375/224 |
| 2012/0322381 | A1* | 12/2012 | Ishizaki ....................... | 455/41.2 |

FOREIGN PATENT DOCUMENTS

| | | |
|---|---|---|
| CN | 102148699 A | 8/2011 |
| WO | WO-2004079991 A1 | 9/2004 |
| WO | WO-2005039109 A1 | 4/2005 |
| WO | WO-2006093634 A1 | 9/2006 |
| WO | WO-2007019104 A2 | 2/2007 |

OTHER PUBLICATIONS

Eu, et al., "Design and Performance Analysis of MAC Schemes for Wireless Sensor Networks Powered by Ambient Energy Harvesting", Ad Hoc Networks, Elsevier, Amsterdam, Netherlands, vol. 9, No. 3, May 2011, pp. 300-323.

Kühl, et al., "Notification of Transmittal of the International Search Report and the Written Opinion of the International Searching Authority, or the Declaration", Patent Cooperation Treaty, Mar. 4, 2013, 13 pages, PCT/US2012/065413, European Patent Office, Rijswijk, Netherlands.

(Continued)

*Primary Examiner* — Gregory Sefcheck
(74) *Attorney, Agent, or Firm* — Parker Ibrahim & Berg LLC; James M. Behmke; Stephen D. LeBarron

(57) ABSTRACT

In one embodiment, an energy-harvesting communication device of a communication network accumulates energy, e.g., electromagnetic energy. Upon detecting that the accumulated energy surpasses a sufficient threshold, the communication device may transmit a message into the communication network using the accumulated energy as an unreliable and unsynchronized broadcast transmission to any available receiver within the communication network.

18 Claims, 11 Drawing Sheets

(56) References Cited

OTHER PUBLICATIONS

Yoshida, et al., "Probabilistic Data Collection Portocols for Energy Harvesting Sensor Networks", 36th Annual IEEE Conference on Local Computer Networks, LCN, Oct. 2011, pp. 366-373.

EnergyHarvesting.net, "What is Energy Harvesting?", www.energyharvesting.net, retrieved Nov. 16, 2011, pp. 1-2.

Tang, et al., "Radio Frequency Energy Harvesting in Wireless Sensor Networks", Proceedings of the 2009 International Conference on Wireless Communications and Mobile Computing: Connecting the World Wirelessly, Jun. 2009, pp. 1-2.

Wikipedia, "Energy Harvesting", http://en.wikipedia.org/wiki/Energy_harvesting, retrieved Nov. 16, 2011, pp. 1-8.

Zhou, et al., "Harvesting Energy from Electromagnetic Field to Support Power Transmission System Monitoring—Preliminary Study", Department of Mechanical Engineering, State University of New York and Stony Brook, Nov. 2008, pp. 13 pages.

* cited by examiner

COMMUNICATION PROTOCOL FOR ENERGY-HARVESTING DEVICES

TECHNICAL FIELD

The present disclosure relates generally to communication networks, and, more particularly, to a communication protocol for energy-harvesting devices.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. For instance, large scale deployment of sensor networks has always faced the problem of providing an energy source to the sensor devices to operate. As such, this has limited the deployment of sensor networks to collect information to a few specific scenarios. With current technologies, sensor networks are mostly made of objects that are either main powered ("plugged in") or battery operated (in which case complex techniques must be used to prolong the life of the network).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
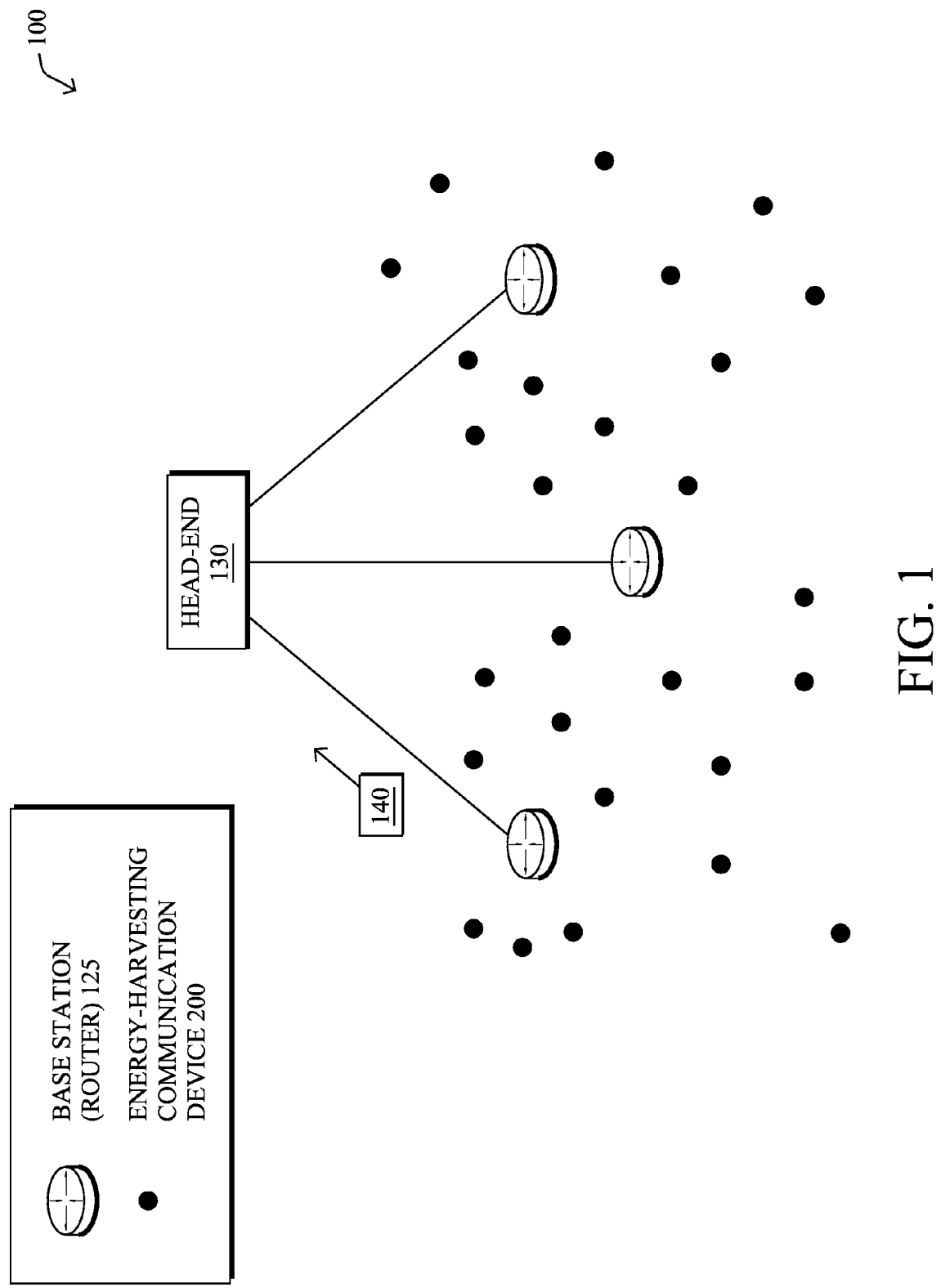
FIG. 1 illustrates an example communication network.

According to one or more embodiments of the disclosure, an energy-harvesting communication device of a communication network accumulates energy, e.g., electromagnetic energy. Upon detecting that the accumulated energy surpasses a sufficient threshold, the communication device may transmit a message into the communication network using the accumulated energy as an unreliable and unsynchronized broadcast transmission to any available receiver within the communication network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Notably, mesh networks have become increasingly popular and practical in recent years. In particular, shared-media mesh networks, such as wireless networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

FIG. 1 is a schematic block diagram of an example computer network 100 illustratively comprising nodes/devices, such as one or more energy-harvesting devices 200 (described below) in communication with one or more base stations 125. Generally, though not necessarily, the energy-harvesting devices 200 are physically disconnected from power and physical communication lines, and communicate using wireless communication. The base stations, in turn, may be interconnected by various methods of communication to each other and/or to one or more head-end devices 130 (e.g., root nodes, field area routers, etc.), such as through wired links or shared media (e.g., wireless links, PLC links, etc.). Shared media communication, in general, is based on certain nodes being in communication with other nodes based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
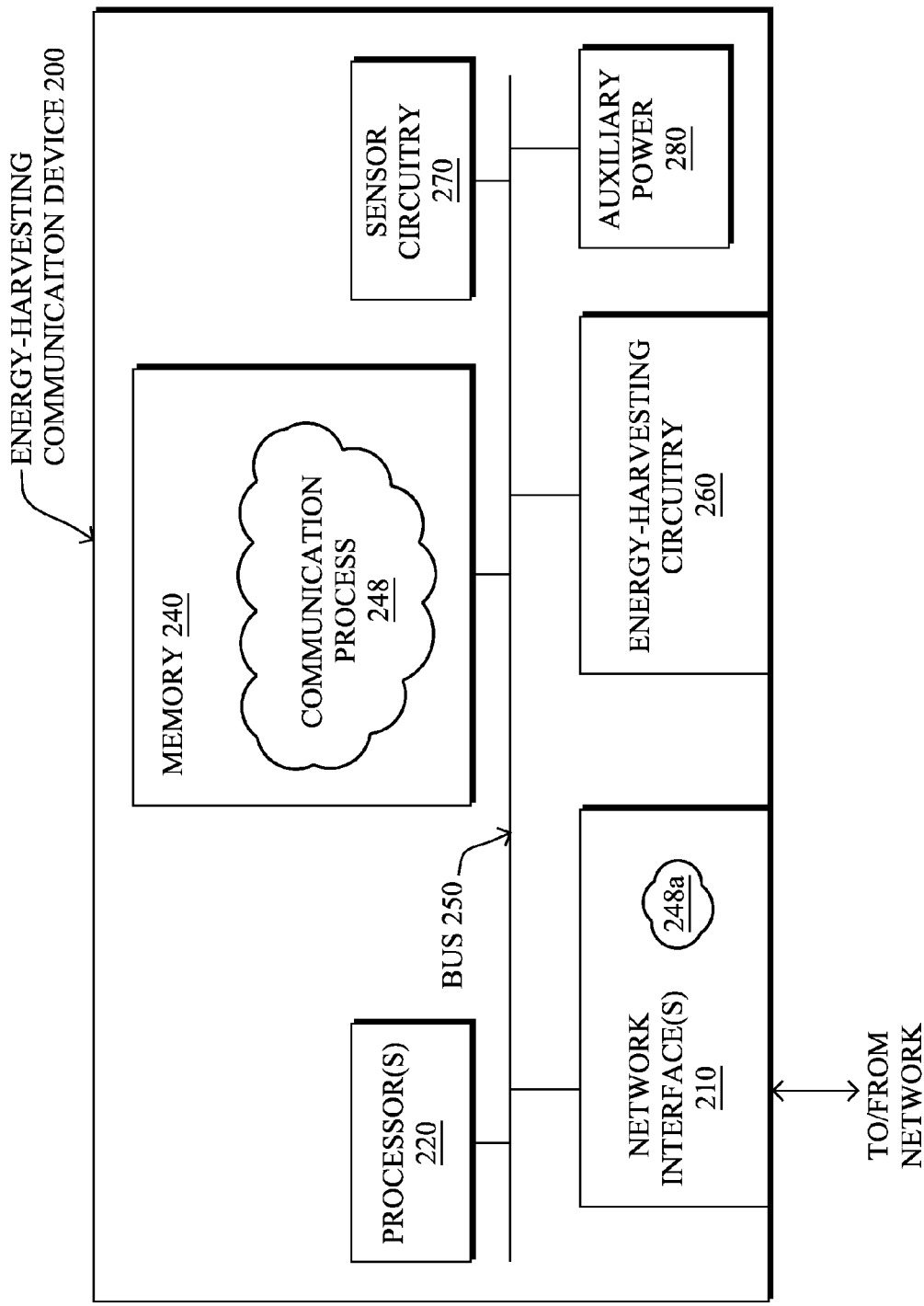
FIG. 2 illustrates an example network device/node.

FIG. 2 is a schematic block diagram of an example energy-harvesting node/device 200 in accordance with one or more illustrative embodiments herein. In general, the device may comprise one or more network interfaces 210 (e.g., wireless), at least one processor 220, and a memory 240 interconnected by a system bus 250. In accordance with the embodiments herein, the device 200 also comprises at least one energy-harvesting circuitry components 260, as described below. In one embodiment, certain devices may have sensor circuitry 270 configured to measure a sensed value (e.g., voltage, temperature, motion, location, etc.). In another embodiment, certain devices 200 may be equipped with an auxiliary power supply 280 (in addition to the accumulated energy, described below), such as a battery, a plug-in supply, etc.

The network interface(s) 210 contain the mechanical, electrical, and signaling circuitry for communicating data over wireless links coupled to the network 100. The network interfaces may be configured to transmit and/or receive data using a variety of different communication protocols.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate data structures. These software processes and/or services may comprise an illustrative communication process 248, as described herein. Note that while communication process 248 is shown in centralized memory 240, alternative embodiments provide for the process to be specifically operated within the network interfaces 210, such as a component of a MAC layer (process "248a"). As described herein, communication process 248 contains computer executable instructions executed by the processor 220 to perform functions provided by one or more communication protocols.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
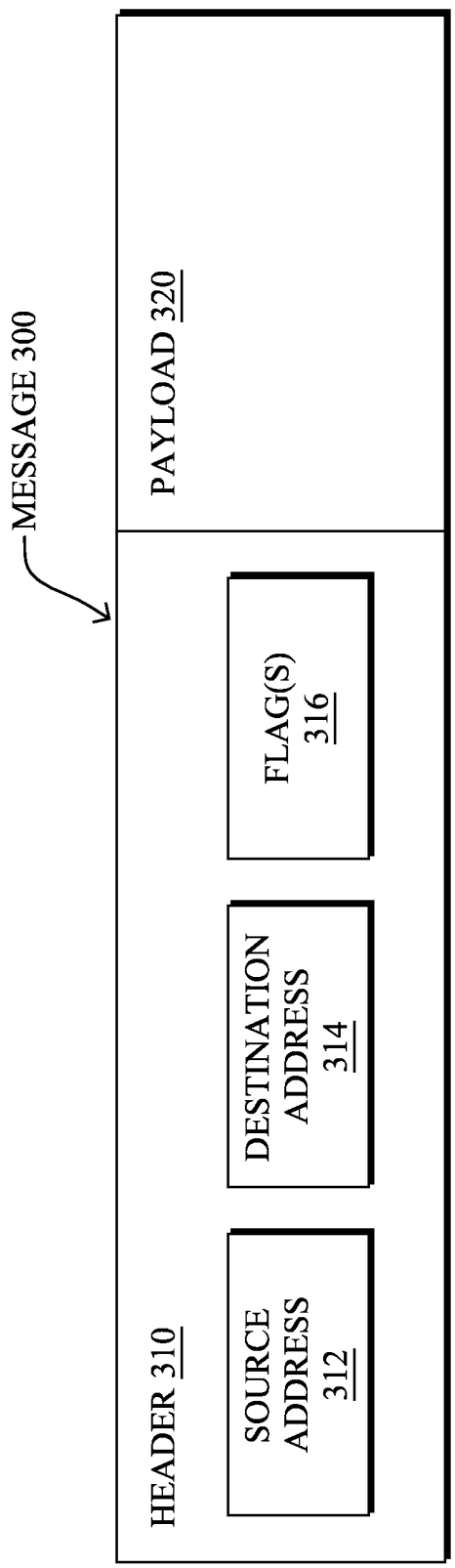
FIG. 3 illustrates an example message format.

Notably, FIG. 3 illustrates an example format for a message 300, e.g., a packet 140, which may be utilized by the device 200. In particular, as a simplified representation, the message 300 may have a header 310 used to transmit the message, and a payload 320 containing the data to be transmitted within the message. Illustratively, the header may, though need not, comprise a source address 312, a destination address 314, and in certain embodiments, one or more flags 316 as described herein.

As noted above, various challenges are presented with LLNs, such as lossy links, low bandwidth, battery operation, low memory and/or processing capability, etc. For instance, large scale deployment of sensor networks has always faced the problem of providing an energy source to the sensor devices to operate. As such, this has limited the deployment of sensor networks to collect information to a few specific scenarios. With current technologies, most sensor networks are made of objects that are either main powered ("plugged in") or battery operated. Using battery powered devices, however, limits the lifetime of such devices, and generally requires the use of very complex energy saving strategies, while also increasing the maintenance and operation costs of device deployment.

According to the techniques herein, networks, such as Smart Connected Communities (SCCs), may be populated with devices 200 that can harvest energy, such as solar, wind, vibration, etc., and in particular addition, the latent electromagnetic energy produced by the ubiquitous use of wireless communication devices. Electromagnetic energy, for example, is available in abundance in various forms from, e.g., WiFi access points, cellular signals, etc. Harvesting the residual energy from these sources can provide a platform to build dense sensor networks that potentially have no energy source constraints. This is especially useful in the context of SCCs and other sensor networks where millions of smart objects may be deployed, since running power lines to each one of them is infeasible and managing battery-operated devices may be cumbersome. As described below, such a system may continuously accumulate energy, and when the stored energy becomes sufficient the device either wakes up and performs one complete cycle of measuring and transmitting readings, or else enters a listening mode acting as a router/relay in a multi-hop sensor network.

Specifically, according to one or more embodiments of the disclosure as described in detail below, an energy-harvesting communication device of a communication network accumulates energy, e.g., electromagnetic energy. Upon detecting that the accumulated energy surpasses a sufficient threshold, the communication device may transmit a message into the communication network using the accumulated energy as an unreliable and unsynchronized broadcast transmission to any available receiver within the communication network.

Illustratively, the techniques described herein may be performed by hardware, software, and/or firmware, such as in accordance with the communication process 248/248a, which may contain computer executable instructions executed by the processor 220 (or independent processor of interfaces 210) to perform functions relating to the novel techniques described herein. For example, the communication process may control transmission and reception via the network interfaces 210, and may also be capable of determining power levels of the energy-harvesting circuitry 260, or else receiving an indication of the power levels. In addition, the illustrative communication process may also be capable of initiating or triggering sensor measurement by sensors 270, as described herein.

Operationally, the energy-harvesting communication devices 200 accumulate energy while within the communication network according to one or more energy harvesting techniques. For instance, as mentioned above, energy may be harvested from various solar, wind, vibration, sources. In one specific embodiment herein, electromagnetic energy harvesting circuitry may comprise self-tunable tank circuits to accumulate the energy available in surrounding electromagnetic fields, such as from other wireless transmissions. A supercapacitor (low leakage capacitor) may also be arranged in a charge pump configuration in order to store the energy at increasing levels, as may be appreciated by those skilled in the art.

Figure 4:
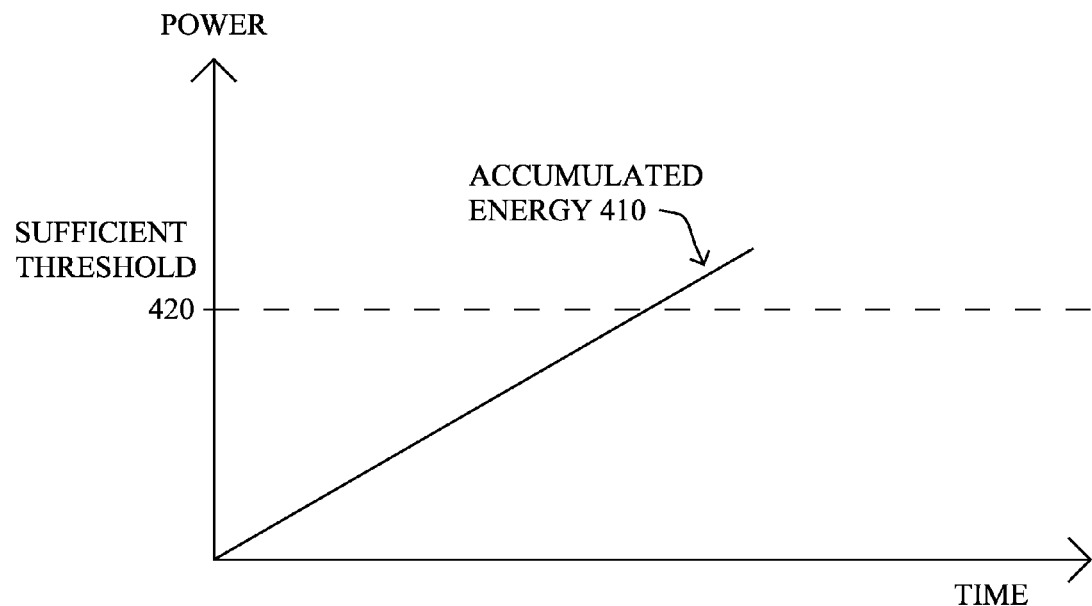
FIG. 4 illustrates an example graph of accumulated power.

FIG. 4 illustrates an example graph of accumulated power 410. Note that the graph need not be interpreted as an approximate accumulation of energy over time, but instead merely represents an illustration to show that energy is in fact accumulated. For example, there may be instances when the energy is depleted or lost, and the energy accumulation line 410 need not experience continual positive growth.

Upon detecting that the accumulated energy 410 surpasses a sufficient threshold 420, for example, a threshold amount of energy needed to perform a set of desired actions (e.g., as described herein), the device 200 may, if determined as needed, correspondingly transmit a message 300 (using the accumulated energy) from the device into the communication network 100 as an unreliable and unsynchronized broadcast transmission to any available receiver within the communication network, generally, that is, without using sophisticated routing protocols. For example, when sending a message, a new flag 316 (e.g., of the IPv6 hop-by-hop option) may be set to indicate that the packet should be broadcasted/multicasted with no attempt to perform reliable transport (at all layers), thus disabling any reliability techniques as may be understood by those skilled in the art, such as activating helping nodes, etc. Note that the message 300 may, in certain situations, be simplified to allow the destination address 314 to be a simple broadcast address, or else to even be removed, but in other embodiments, a specific device destination address may be included in the transmitted message (e.g., pre-configured, determined based on a bootstrap procedure, etc.).

Figure 5:
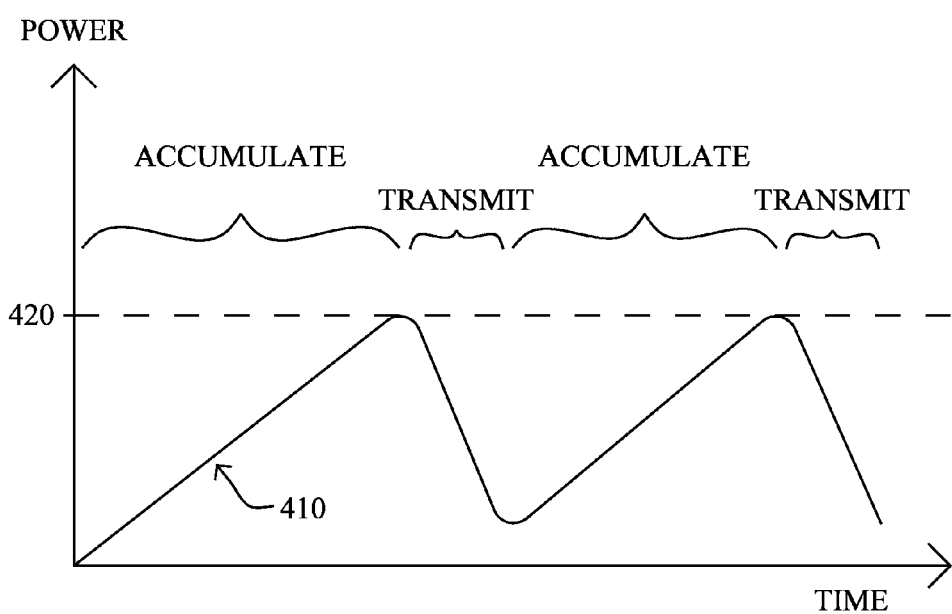
FIG. 5 illustrates an example graph of utilizing the accumulated power for transmitting a message.

FIG. 5 illustrates an example graph of utilizing the accumulated power 410 for transmitting a message. For instance, according to an illustrative embodiment herein, the tank circuit (energy harvesting circuitry 260) harvests and stores energy for shorts bursts of time, during which transmissions may occur to utilize (deplete, expend, etc.) the accumulated energy. According to a specific embodiment, this operation is sufficient for sensor modules that send short messages 300 periodically. That is, the techniques herein are particularly suitable for sensor devices as they often do not have to provide a continuous stream of data. For example, the sensor devices only have to wake once in a while, obtain measurements, and transmit them to a base station. Accordingly, in response to the accumulated energy surpassing the sufficient threshold 420, the device may first measure a sensed value (sensor circuitry 270), such that the message payload 320 contains the correspondingly sensed value.

In the case where a large number of sensors are deployed, which may be the general configuration of many sensor networks (such as SCCs), even if the sensor data is lost due to communication errors, it does not disrupt or considerably affect the performance of the systems as a whole. This is especially true in dense environments where the reported information will likely be redundant. Hence there is generally no need for reliable/complex communication or routing protocols. The message 300 may simply be broadcasted into the network 100 with no attempt to provide any sort of reliability, thus conserving as much energy as possible.

Figure 6:
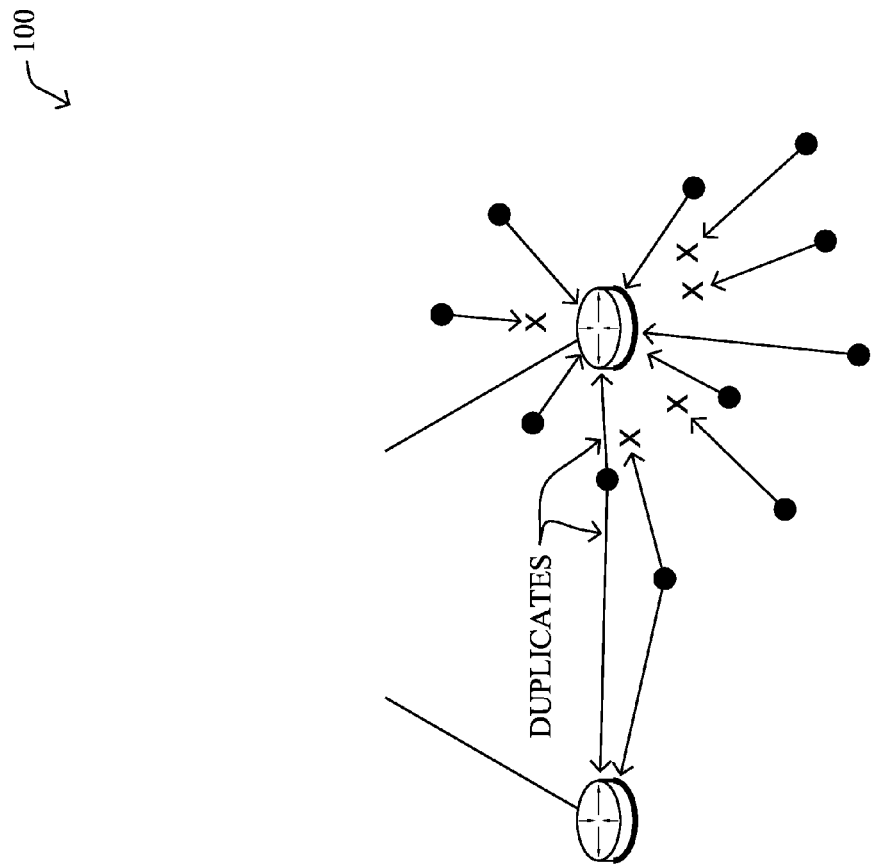
FIG. 6 illustrates an example of message communication in the network shown in FIG. 1.
Figure 6:
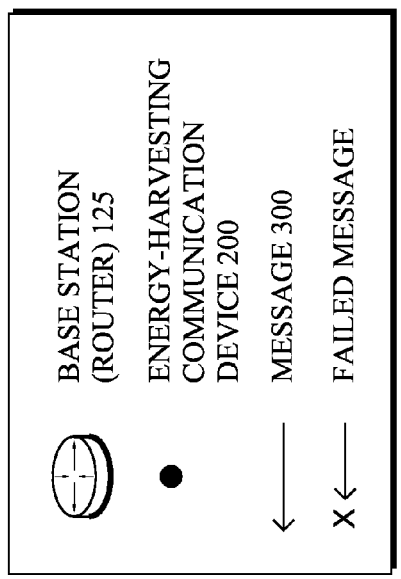

FIG. 6 illustrates an example of message communication in a portion of the network 100 shown in FIG. 1. In particular, since the high density of the illustrative sensor network creates quite a lot of redundancy in data, the lack of a reliable delivery mechanism does not matter. Such a system also requires no synchronization, which could otherwise be a significant overhead. That is, as each sensor node wakes up when it has enough power for a measure-transmit cycle, it sends the data to any locally available base station 125 without concern for synchronizing the transmission. The base stations may be distributed across the area to receive such broadcasted transmissions, and even if the same data is picked up by two or more base stations, the hierarchy of the network will generally ensure that the higher-level device eliminates the duplicates or recognizes the redundancy, as may be appreciated by those skilled in the art.

Note that the lack of synchronization may sometimes pose a problem as devices might wake up at the same time, resulting in a collision of transmissions. Accordingly, in one or more embodiments herein each node may transmit its data after applying a random back-off timer to the message. Alternatively or in addition, the devices may transmit a plurality of copies of the message, where each copy is separated by a random back-off time (i.e., performing multiple transmissions at random instants of time).

Figure 7:
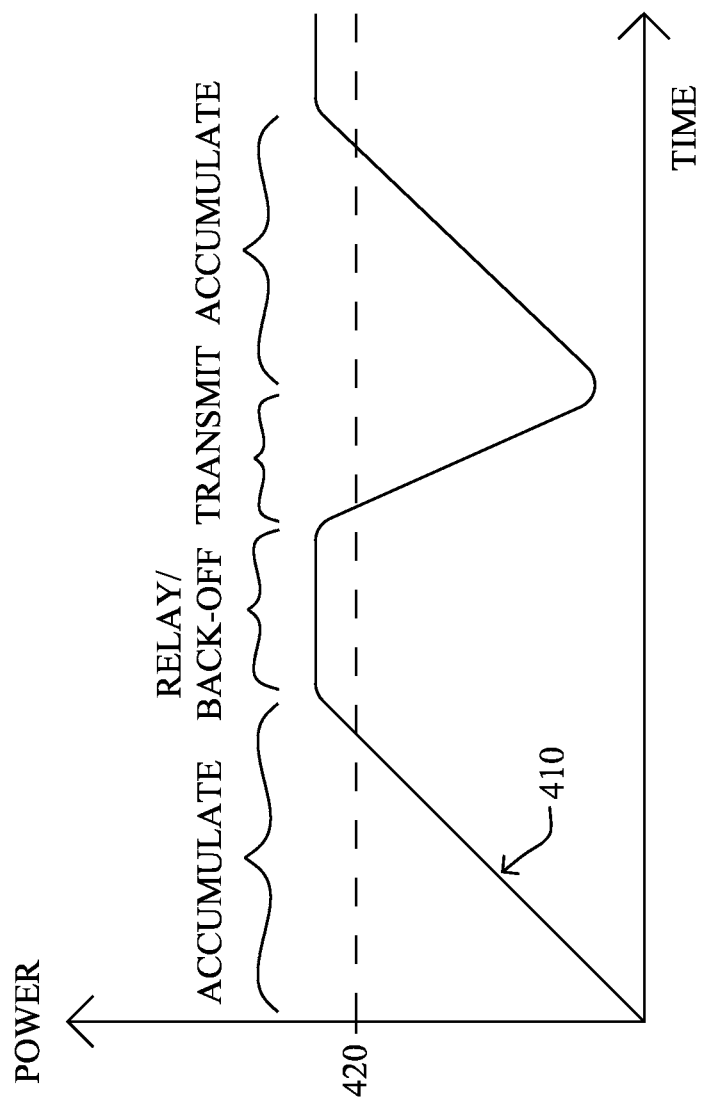
FIG. 7 illustrates an example of accumulated power and delayed transmission.

For example, FIG. 7 illustrates an example of accumulated power and delayed transmission, such as where the device's accumulated energy 410 surpasses the threshold 420, but the device delays the transmission (e.g., back-off timers). In addition to back-off timers, the techniques here may also include logic that ensures that there is a minimum time between transmissions, even in the case where the energy-harvesting circuitry 270 (e.g., the capacitor) is recharged very quickly. Delaying at least a minimum amount of time between message transmissions in this manner may also help reduce collisions in the network, as the general number of transmissions within a given amount of time may be greatly reduced. Note that while FIG. 7 illustrates a system that does not accumulate more energy during this delay, certain systems may be configured to still accumulate more energy while awaiting the transmission. Note further, that in the instance where multiple duplicate messages are to be sent, one embodiment may wait for sufficient energy to be re-accumulated for a subsequent transmission, or else the threshold 420 may be raised to account for the multiple energy-expending transmissions, accordingly.

In addition to the random back-offs or delays, the device may generally determine whether to transmit the message in the first place. For instance, in yet another embodiment, a device 200 (e.g., as a smart object) that has accumulated enough energy to send a message may defer transmitting the message if the last sensed data was too recent, or deferring transmitting the message until a sufficient change to the sensed value occurs.

Generally, devices relying solely on energy-harvesting power sources will ideally be collocated with any device that has a greater level of power connectivity, e.g., batteries or more particularly being connected to main power (plugged in). However, this may not always be the case, or else communication interferences may result in energy-harvesting devices not being able to communicate with such devices, regardless of the original intent of the system designer.

Accordingly, in one or more embodiments herein, in response to determining not to transmit a message at a particular time, a "receiver mode" may be activated on the communication device to listen for and correspondingly relay received transmissions from within the communication network. That is, instead of transmitting a message (not ready, not different, etc., as mentioned above), the device may be configured to enter into a listening mode of operation consisting of turning its communication module (more specifically, it's receiver circuitry) "on" in order to relay packets sent by other sensors.

Figure 8:
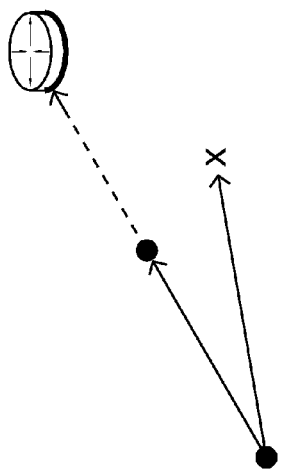
FIG. 8 illustrates an example of a relayed transmission by a device in a receiver mode.
Figure 8:
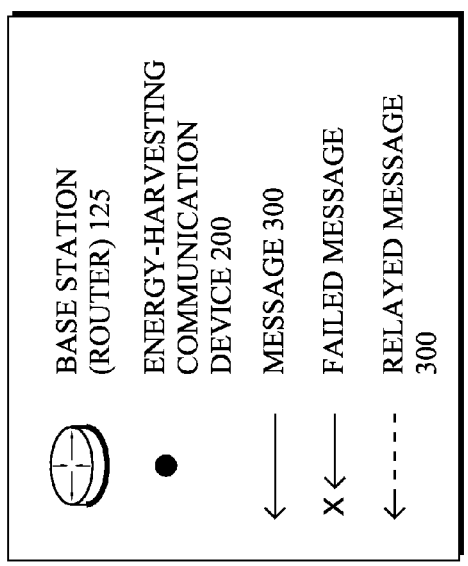

FIG. 8 illustrates an example of a relayed transmission by a device in a receiver mode. In this mode, a device may activate its receiver to listen for broadcast transmissions from other devices. Upon receiving such a transmission, the relay device may then re-transmit (re-broadcast) the message 300, thus helping to provide an end-to-end path to the destination in a multi-hop network. This is useful in both sparse and dense environments, providing multi-hop transmission for devices that may not be able to reach the intended destination otherwise. (Note that for dense environments, certain provisions may be taken to account for broadcast storms, depending upon how many relay devices are active and repeating the same messages within the network.)

Notably, the communication module (receiver mode) could be turned on and off according to the level of accumulated energy in order to maintain enough energy to send a message from the device itself (e.g., its own sensed data) when required. For example, the operation may be toggled according to a pre-defined schedule (listening continuously or periodically for received transmissions during receiver mode), or else based on upper and lower thresholds of energy levels. In either event, the intent is to prevent the communication device 200 from expending the accumulated energy below the sufficient threshold 420 while in the receiver mode.

Figure 9A:
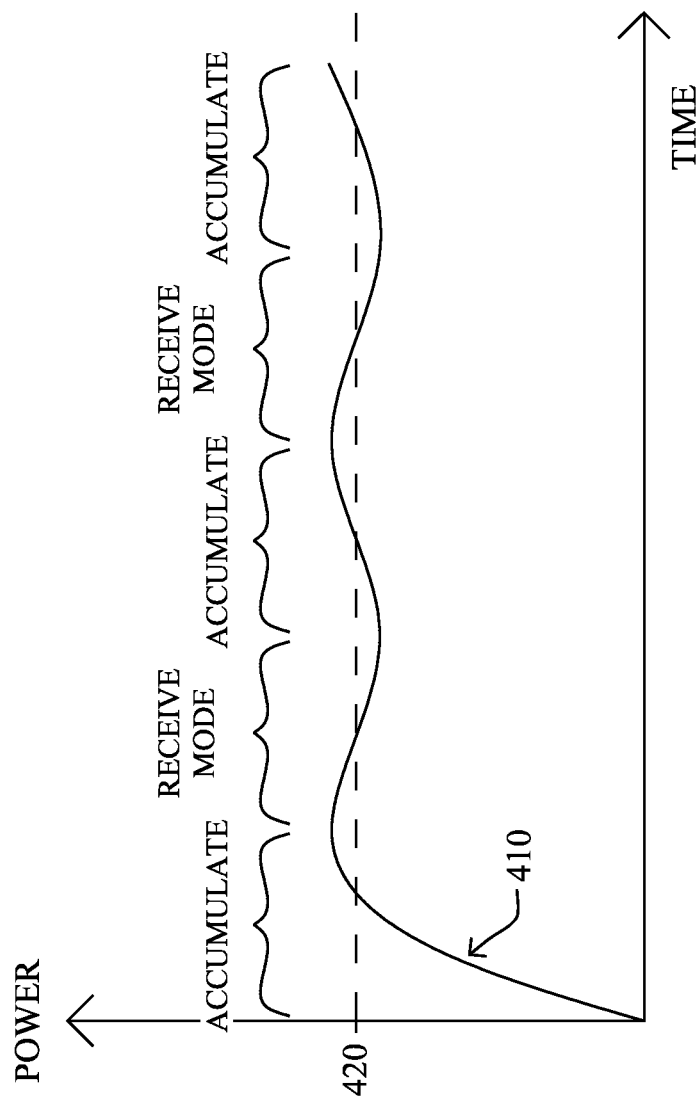
FIGS. 9A-9C illustrate examples of accumulated power levels throughout receiver mode and during transmission of a message.

FIG. 9A illustrates an example of accumulated power levels throughout receiver mode as described above. For instance, upon surpassing the sufficient threshold 420 of accumulated power, the device may enter into the receiver mode and activate its receiver to listen for any broadcast transmissions that could be relayed. As shown, the receiver mode does utilize energy, and as such, in the event the energy utilized occurs at a greater rate than the energy accumulated, the device may turn off the receiver in order to re-accumulate sufficient energy to continue in receiver mode.

Figure 9B:
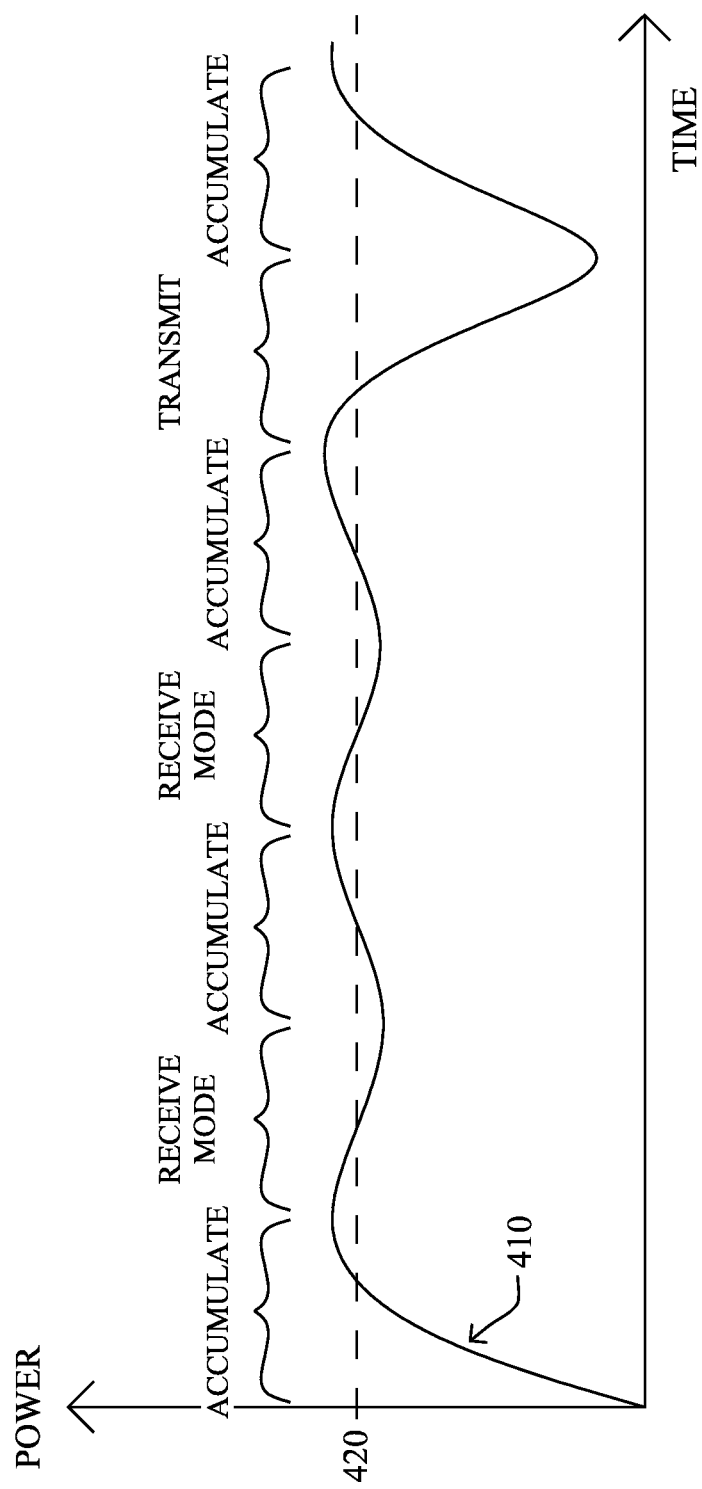
Figure 9C:
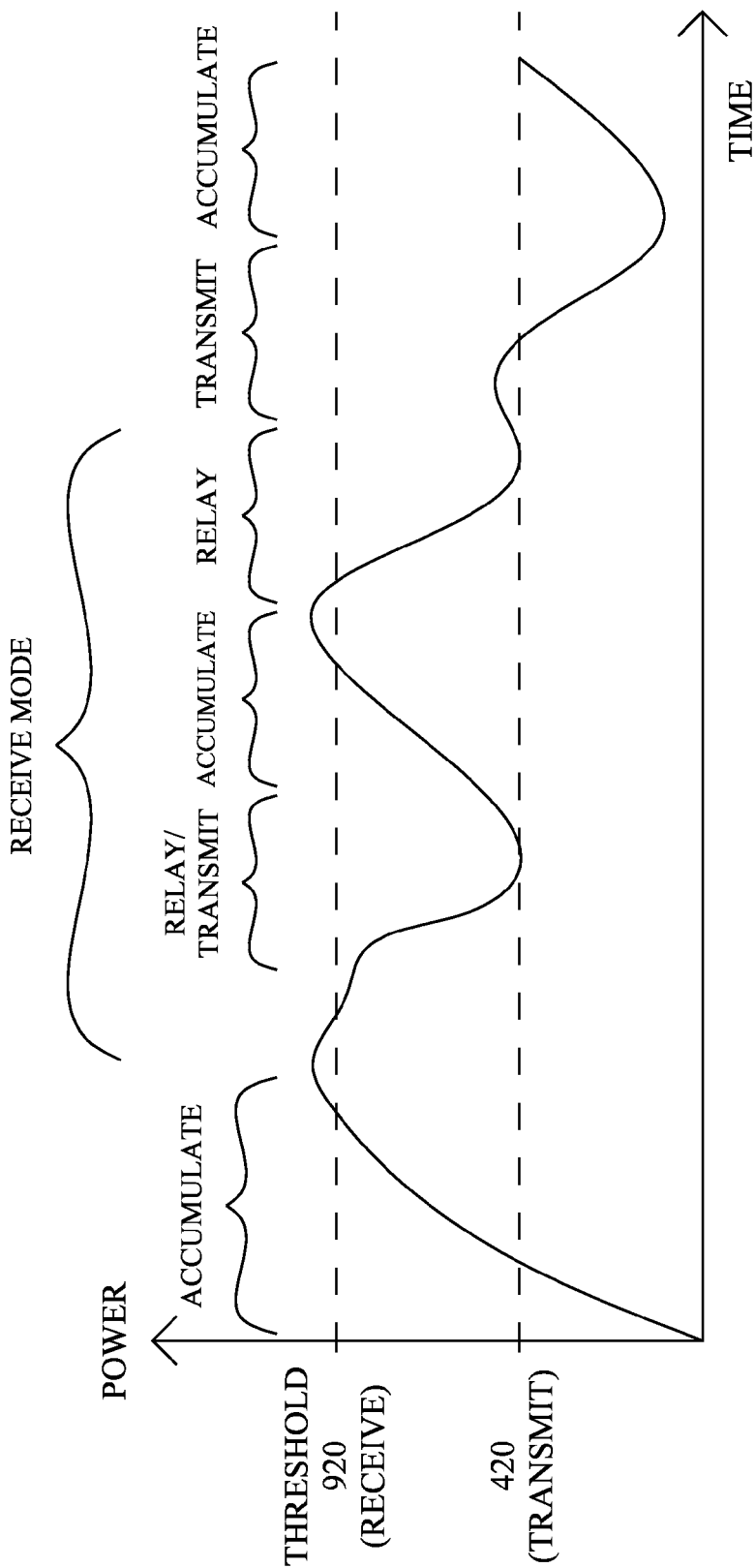

In addition, FIG. 9B illustrates the power levels when the relaying device actually transmits a message, whether its own message or else a relayed message as described above. As shown, the energy level may be reduced below the sufficient threshold 420, and would need to be replenished prior to re-entering a receiver mode, or prior to transmitting another messages. According to one or more embodiments, therefore, the energy-harvesting devices 200 may be configured with two thresholds, as illustrated in FIG. 9C, the first being a transmission-sufficient threshold 420, and the second being a greater threshold 920 that triggers the receive mode. In this manner, the device 200 may ensure that it has enough energy to transmit its own messages, or else to relay messages and its own messages, etc., depending upon the configuration of the thresholds.

Alternatively or in addition, main-powered devices could be added to the network serving as relays if the number of lost packets (comparing the number of sent packets logged on each device and the number of received packets) exceeds some threshold. In certain situations, however, it may be difficult to add main-powered devices to a network after it has been deployed. Accordingly, it may be beneficial to provide the energy-harvesting devices 200 with an auxiliary power supply 280 in addition to the accumulated energy. In this embodiment, devices may be dynamically activated as relays, such as in response to receiving a directive to activate the receiver mode on the communication device. Note that this dynamicity may require that the energy-harvesting devices occasionally enter a listening mode to receive such a directive, but one solution is where the device first activates the receive mode in response to having enough harvested energy as described above, and then receives the directive to stay in the mode for as long as possible (e.g., until expenditure of the auxiliary power or harvested power).

Figure 10:
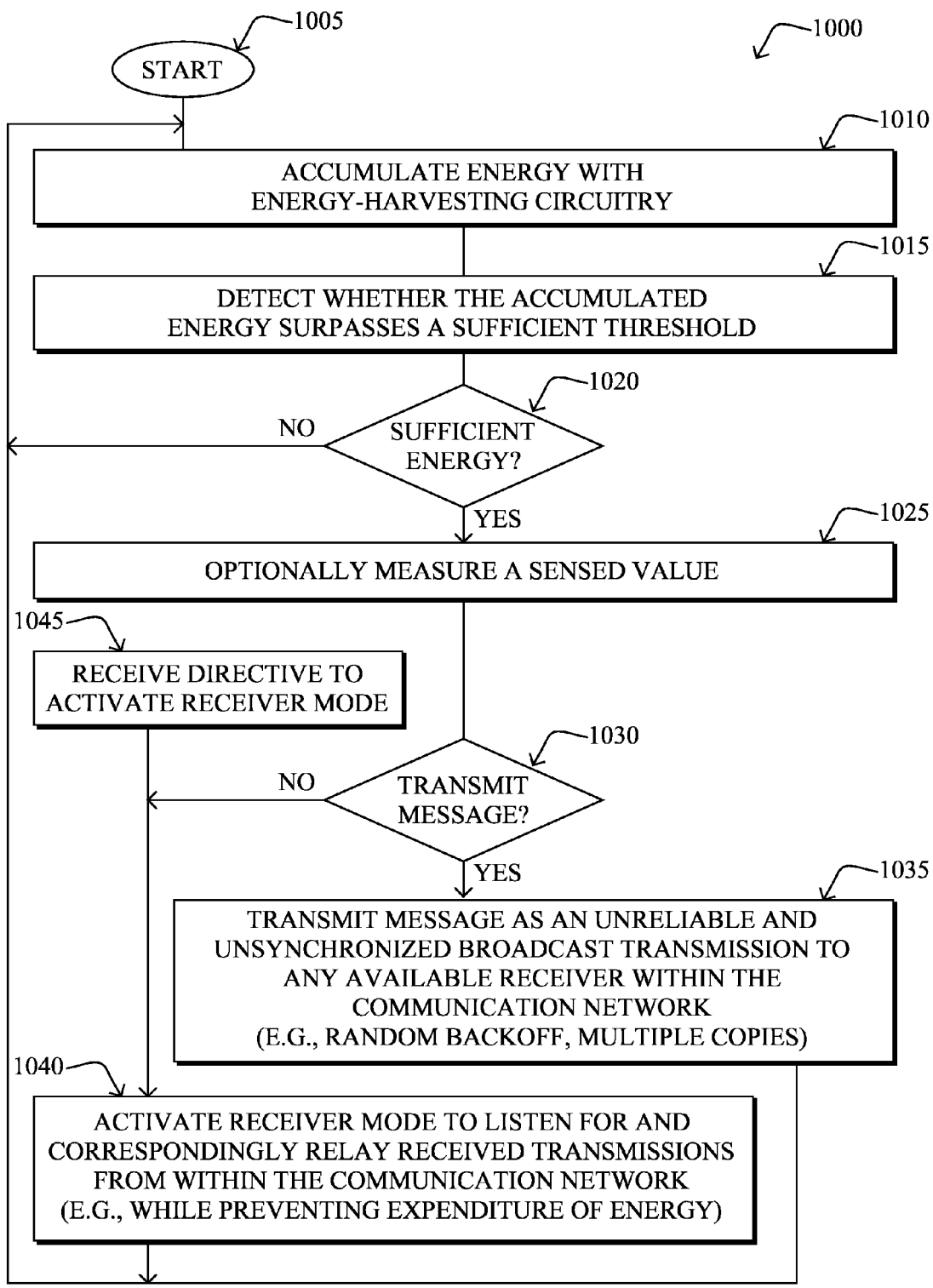
FIG. 10 illustrates an example simplified procedure for energy-harvesting device communication.

FIG. 10 illustrates an example simplified procedure for energy-harvesting device communication in accordance with one or more embodiments described herein. The procedure 1000 starts at step 1005, and continues to step 1010, where, as described in greater detail above, a device 200 accumulates energy with energy-harvesting circuitry 260. In step 1015, the device detects whether the accumulated energy surpasses a sufficient threshold 420. If not, the energy may continue to accumulate in step 1010. However, once there is sufficient energy, the device may optionally (in certain embodiments) measure a sensed value in step 1025, and in step 1030, determines whether to transmit a message, as described above. In particular, the device may delay the transmission, defer the transmission, or may simply not have anything to transmit at the time.

If transmitting the message, then in step 1035 the device transmits the message 300 as an unreliable and unsynchronized broadcast transmission to any available receiver within the communication network 100. For instance, as described above, the transmission may be based on a random back-off time, and/or may include multiple copies. Alternatively, if not transmitting the message, the device may, though need not, activate a receiver mode in step 1040 to listen for and correspondingly relay received transmissions from within the communication network, as described above (e.g., while preventing expenditure of energy). Note that in certain embodiments as detailed above, the receiver mode in step 1040 may be initiated in response to the device receiving a directive to activate its receiver mode in step 1045. The procedure 1000 continues to accumulate energy in step 1010, and may either transmit additional messages, or else continue in receiver mode according to the techniques herein, accordingly.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for a communication protocol for use by energy-harvesting devices in a communication network. In particular, due to the fact that devices use harvested energy, the devices are not required to listen for long preambles, and instead operate with simple network broadcasting. In addition, the techniques provide for sets of devices to act as hosts and others to act as relays (e.g., "degenerated" routers) when needed. In other words, the techniques herein do not merely harvest energy and then participate in conventional routing protocols, but instead, they provide a set of communication techniques optimized for the operation of energy harvesting devices, such as unsynchronized transmissions, unreliable transport, and generally unsophisticated routing mechanisms.

For instance, the combination of such techniques with energy-harvesting devices may be particularly suitable at the very least for high-density, high-redundancy, mesh/sensor networks (e.g., LLNs). That is, in contrast with current networks that require main power or battery power (e.g., sensors that are thus limited in terms of functionality because they are battery operated), the techniques herein provide the capability to deeply embed sensor devices into the platform, which allows for continuous monitoring of the environment using broadcast techniques and very low maintenance, while not requiring to be main powered or to use battery source of energy.

For example, an energy harvesting system as described above provides for the possibility of embedding sensor devices into buildings and other structures/entities where intrusive maintenance procedures cannot be conducted. For instance, embedding strain gauges into the concrete columns and beams of a structure can provide a clear picture of the effects of weather, earthquakes, etc. on a building. Pre-emptive maintenance procedures can also be performed using the data generated by such sensors. The whole process will continue to be repeated over and over again providing periodic sensor readings to the base station, and batteries will never need to be replaced.

While there have been shown and described illustrative embodiments that provide for a communication protocol for use by energy-harvesting devices in a communication network, it is to be understood that various other adaptations and modifications may be made within the spirit and scope of the embodiments herein. For example, the embodiments have been shown and described herein with relation to sensor networks. However, the embodiments in their broader sense are not as limited, and may, in fact, be used with other types of networks that may benefit from the use of energy-harvesting devices. For example, other types of communication devices, such as personal emergency communicators, locators (e.g., emergency locator transmitters or "ELTs"), etc., may be adapted to contain energy-harvesting circuitry, in which case such devices may also benefit from such communication techniques as described herein. In addition, while the embodiments above generally described packetized transmissions, the techniques may also be applied to non-packetized transmissions, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   accumulating energy at an energy-harvesting communication device of a communication network, wherein the accumulated energy is harvested from electromagnetic energy generated by other sensors in the communication network;
   detecting when the accumulated energy surpasses a sufficient threshold;
   in response to the accumulated energy surpassing the sufficient threshold, determining whether a message needs to be transmitted and measuring a sensed value by the energy-harvesting communication device, wherein the message contains the sensed value;
   in response to determining that the message needs to be transmitted and the accumulated energy has surpassed the sufficient threshold, first transmitting, using the accumulated energy, the message from the energy-harvesting communication device into the communication network as an unreliable and unsynchronized broadcast transmission to any available receiver within the communication network, wherein the message is transmitted prior to receiving any messages after a node has entered a charging mode and includes a flag indicating that the message should be transmitted as a broadcast with no attempt to perform reliable transport; and
   in response to determining that the message does not need to be transmitted and the accumulated energy has surpassed the sufficient threshold, activating a receiver mode on the energy-harvesting communication device to listen for and correspondingly relay received transmissions from within the communication network.

2. The method as in claim 1, further comprising:
   preventing the energy-harvesting communication device from expending the accumulated energy below the sufficient threshold while in the receiver mode.

3. The method as in claim 1, further comprising:
   listening periodically for received transmissions during receiver mode.

4. The method as in claim 1, further comprising:
   applying a random back-off timer to transmitting the message.

5. The method as in claim 1, wherein transmitting the message comprises:
   transmitting a plurality of copies of the message, each copy separated by a random back-off time.

6. The method as in claim 1, further comprising:
   delaying at least a minimum amount of time between message transmissions.

7. The method as in claim 1, further comprising:
   deferring transmitting the message until a sufficient change to the sensed value occurs.

8. The method as in claim 1, wherein transmitting comprises:
   including a specific device destination address in the transmitted message for each available receiver.

9. The method as in claim 1, further comprising:
   receiving a directive to activate a receiver mode on the energy-harvesting communication device, wherein the energy-harvesting communication device has an auxiliary power supply in addition to the accumulated energy; and in response
   activating the receiver mode on the energy-harvesting communication device to listen for and correspondingly relay received transmissions from within the communication network.

10. An apparatus, comprising:
    energy-harvesting circuitry configured to accumulate energy from electromagnetic energy generated by other sensors in the communication network;
    one or more network interfaces to communicate within a communication network;
    a processor coupled to the network interfaces and adapted to execute one or more processes; and
    a memory configured to store a process executable by the processor, the process when executed operable to:

detect when the accumulated energy surpasses a sufficient threshold;

in response to the accumulated energy surpassing the sufficient threshold, determine whether a message needs to be transmitted and measuring a sensed value by the energy-harvesting communication device, wherein the message contains the sensed value;

in response to a determination that the message needs to be transmitted and the accumulated energy has surpassed the sufficient threshold, first transmit the message into the communication network using the accumulated energy, the message transmitted as an unreliable and unsynchronized broadcast transmission to any available receiver within the communication network, wherein the message is transmitted prior to receiving any messages after a node has entered a charging mode and includes a flag indicating that the message should be transmitted as a broadcast with no attempt to perform reliable transport; and in response to determining that the message does not need to be transmitted and the accumulated energy has surpassed the sufficient threshold, activating a receiver mode on the energy-harvesting communication device to listen for and correspondingly relay received transmissions from within the communication network.

11. The apparatus as in claim 10, wherein the process when executed is further operable to:

prevent expenditure of the accumulated energy below the sufficient threshold while in the receiver mode.

12. The apparatus as in claim 10, wherein the process when executed to transmit the message is further operable to:

transmit a plurality of copies of the message, each copy separated by a random back-off time.

13. The apparatus as in claim 10, further comprising:

sensor circuitry configured to measure a sensed value; and wherein the process when executed is further operable to:
measure a sensed value with the sensor circuitry in response to the accumulated energy surpassing the sufficient threshold, wherein the message contains the sensed value.

14. The apparatus as in claim 10, further comprising:

an auxiliary power supply in addition to the accumulated energy and;

wherein the process when executed is further operable to:
receive a directive to activate a receiver mode; and in response activate the receiver mode to listen for and correspondingly relay received transmissions from within the communication network.

15. The apparatus as in claim 10, wherein the electromagnetic energy harvesting circuitry comprises a self-tunable tank circuit adapted to accumulate energy from electromagnetic fields.

16. The apparatus as in claim 15, wherein the self-tunable tank circuit comprises a super-capacitor arranged in a charge pump configuration.

17. A tangible, non-transitory, computer-readable media having software encoded thereon, the software, when executed by a processor on an energy-harvesting communication device, operable to:

detect when accumulated energy at the energy-harvesting communication device surpasses a sufficient threshold, wherein the accumulated energy is harvested from electromagnetic energy generated by other sensors in the communication network;

in response to the accumulated energy surpassing the sufficient threshold, determine whether a message needs to be transmitted and measuring a sensed value by the energy-harvesting communication device, wherein the message contains the sensed value; and in response to a determination that the message needs to be transmitted and the accumulated energy has surpassed the sufficient threshold, first transmit the message into the communication network using the accumulated energy, the message transmitted as an unreliable and unsynchronized broadcast transmission to any available receiver within the communication network, wherein the message is transmitted prior to receiving any messages after a node has entered a charging mode and includes a flag indicating that the message should be transmitted as a broadcast with no attempt to perform reliable transport; and in response to determining that the message does not need to be transmitted and the accumulated energy has surpassed the sufficient threshold, activating a receiver mode on the energy-harvesting communication device to listen for and correspondingly relay received transmissions from within the communication network.

18. The computer-readable media as in claim 17, wherein the software when executed is further operable to:

measure a sensed value in response to the accumulated energy surpassing the sufficient threshold, wherein the message contains the sensed value.

* * * * *